(12) United States Patent
Hoffjann et al.

(10) Patent No.: US 8,556,211 B2
(45) Date of Patent: Oct. 15, 2013

(54) DOUBLE-WALLED FLOOR SEGMENT FOR A MEANS OF LOCOMOTION FOR ACCOMMODATING SYSTEM COMPONENTS

(75) Inventors: Claus Hoffjann, Hamburg (DE); Markus Maibach, Hamburg (DE); Wolfgang Zierold, Hamburg (DE)

(73) Assignee: Airbus Operations GmbH (DE)

( * ) Notice: Subject to any disclaimer, the term of this patent is extended or adjusted under 35 U.S.C. 154(b) by 701 days.

(21) Appl. No.: 12/223,830

(22) PCT Filed: Feb. 8, 2007

(86) PCT No.: PCT/EP2007/001083
§ 371 (c)(1),
(2), (4) Date: Dec. 2, 2009

(87) PCT Pub. No.: WO2007/093321
PCT Pub. Date: Aug. 23, 2007

(65) Prior Publication Data
US 2010/0127123 A1    May 27, 2010

Related U.S. Application Data

(60) Provisional application No. 60/773,761, filed on Feb. 15, 2006.

(30) Foreign Application Priority Data

Feb. 15, 2006  (DE) .......................... 10 2006 007 027

(51) Int. Cl.
*B64C 1/20*    (2006.01)
(52) U.S. Cl.
USPC ...................................................... 244/118.1

(58) Field of Classification Search
USPC ........................... 244/119, 120, 118.1, 117 R
See application file for complete search history.

(56) References Cited

U.S. PATENT DOCUMENTS

| | | | | |
|---|---|---|---|---|
| 4,066,227 A | * | 1/1978 | Buchsel | 244/118.6 |
| 4,479,621 A | * | 10/1984 | Bergholz | 244/117 R |
| 4,648,570 A | * | 3/1987 | Abdelmaseh et al. | 244/118.1 |
| 4,915,609 A | * | 4/1990 | Hahn et al. | 425/384 |
| 5,086,996 A | * | 2/1992 | Roeder et al. | 244/119 |
| 5,540,404 A | * | 7/1996 | Battenfield | 244/129.5 |
| 5,779,193 A | * | 7/1998 | Sloan | 244/117 R |
| 6,003,812 A | * | 12/1999 | Micale et al. | 244/117 R |

(Continued)

FOREIGN PATENT DOCUMENTS

| | | |
|---|---|---|
| DE | 2908823 A1 | 9/1980 |
| DE | 3141869 A1 | 5/1983 |

(Continued)

*Primary Examiner* — Timothy D Collins
*Assistant Examiner* — Keith L Dixon
(74) *Attorney, Agent, or Firm* — Lerner, David, Littenberg, Krumholz & Mentlik, LLP

(57) ABSTRACT

A floor segment for a transportation system, in particular for an aircraft, for the spatial separation of an interior space of the into a lower space and into an upper space. The floor segment has an upper partition and a lower partition, which together with the upper partition encloses a hollow space, which is equipped for accommodating system component of the aircraft. Preferably, the floor segments are of a modular design so that within a floor individual floor segments can be exchanged for other floor segments that comprise identical or compatible dimensions and connections for the system components.

26 Claims, 3 Drawing Sheets

(56) References Cited

U.S. PATENT DOCUMENTS

| | | | | |
|---|---|---|---|---|
| 6,039,288 A | * | 3/2000 | Huber et al. | 244/118.1 |
| 8,074,928 B2 | * | 12/2011 | Haack et al. | 244/119 |
| 2002/0168184 A1 | * | 11/2002 | Meisiek | 392/435 |
| 2003/0005852 A1 | | 1/2003 | Okamura et al. | |
| 2007/0181745 A1 | * | 8/2007 | Huber | 244/118.1 |

FOREIGN PATENT DOCUMENTS

| | | |
|---|---|---|
| DE | 10244189 | 6/2003 |
| EP | 0311711 | 4/1989 |
| EP | 0497045 | 8/1992 |
| EP | 0514650 | 11/1992 |
| EP | 0905000 | 3/1999 |
| EP | 1714868 | 10/2006 |
| GB | 2301796 A | 12/1996 |
| JP | 58-78895 | 5/1983 |
| JP | 04-303308 | 10/1992 |
| JP | 07-165191 | 6/1995 |
| RU | 1802483 A1 | 6/1996 |
| SU | 948068 A1 | 12/1987 |
| WO | 9925601 | 5/1999 |
| WO | 03047970 | 6/2003 |
| WO | 2005001205 | 1/2005 |
| WO | 2005/012085 A1 | 2/2005 |

* cited by examiner

DOUBLE-WALLED FLOOR SEGMENT FOR A MEANS OF LOCOMOTION FOR ACCOMMODATING SYSTEM COMPONENTS

REFERENCE TO RELATED APPLICATIONS

This application claims the benefit of the filing date of the German Patent Application No. 10 2006 007 027.5 filed Feb. 15, 2006 and of the U.S. Provisional Patent Application No. 60/773,761 filed Feb. 15, 2006, the disclosure of which is hereby incorporated herein by reference.

FIELD OF THE INVENTION

The invention relates to a floor segment for a means of locomotion, in particular for an aircraft, for the spatial separation of an interior space of the means of locomotion into a lower space and into an upper space. The invention further relates to a means of locomotion with a floor that separates an interior space of the means of locomotion into a lower space and into an upper space, wherein the floor comprises at least two floor segments of the type mentioned above.

TECHNOLOGICAL BACKGROUND

The efficiency and the profitability of modern passenger aircraft dictate that the space that is available in the cabin be optimised when compared to aircraft models of the same class. The space available to each individual passenger has a direct influence on the comfort of passengers.

A further important efficiency factor with passenger aircraft is the payload provided by the respective aircraft. With a predefined takeoff weight of an aircraft, an increase in the payload can be achieved in particular if the so-called system mass and the so-called mass of expendable supplies are kept as low as possible.

In this context the term system mass relates to that mass that is required when a modern passenger aircraft is fitted out. This includes, for example, the mass of apparatus of a freshwater system or a service water system, air conditioning system and electrical equipment such as, for example, video recorders, monitors or audio systems. As far as the term "mass of expendable supplies" is concerned, in particular the mass of fuel carried on board is relevant.

Increases in the efficiency of modern aircraft engines, as well as improved aerodynamics in modern passenger aircraft, partly reflect the above-mentioned requirements. However, further improvements can only be achieved by way of a change in the aircraft architecture. This refers to a clever selection and arrangement of components that are required for fitting out the interior of an aircraft.

SUMMARY OF THE INVENTION

An aspect of the present invention to provides an improved interior architecture, in particular for passenger aircraft, which interior architecture makes an important contribution in relation to increased efficiency of the payload and the available space provided.

The above-mentioned floor segment is used for spatial separation of an interior space of the means of locomotion into a lower space and into an upper space. The floor segment comprises an upper partition and a lower partition, the latter together with the upper partition enclosing a hollow space. The hollow space is equipped for accommodating system components of the means of locomotion.

The floor segment described is based on the idea that an increase in the volume of aircraft cabin space available to passengers can be achieved in that system components can be installed between the two partitions. In this arrangement the floor segment forms a hollow body. However, it is not necessary for the hollow body to be hermetically sealed off from its environment. Instead, the partitions can comprise apertures or recesses so that the hollow space of the floor segment is accessible from the outside.

Hereinafter, the term "system components" refers to all components that form part of the outfit of modern passenger aircrafts, which components have a direct or indirect influence on the level of comfort of the passengers. Thus, the system components not only include the entire freshwater system or waste water system, components of an air conditioning system, as well as electronic devices, but also line systems for distributing and bringing together liquids and/or gases, as well as electrical and/or optical lines for controlling or regulating electrical equipment located in the passenger compartment. Furthermore, the term "system components" also includes data transmission and communication devices that can be used by the passengers and/or the crew of an aircraft.

Furthermore, the floor segment described above is based on the idea of creating, within the aircraft, a dedicated space for system components that are preferably permanently installed in the interior space of the aircraft. In this way the greatest possible degree of separation can be realised between the useful regions of the cabin, which regions are available to passengers, and the regions for cabin systems that are required for the system components that have to be carried on board. This space, which is available for the system components, is provided by the hollow space in the floor segment, which floor segment comprises a sandwich-like structure comprising an upper partition and a lower partition. In particular in the case of designing a floor with a multitude of floor segments, a hollow space is thus created that is sufficiently large to accommodate all the system components required for the cabin systems.

Preferably, the individual floor segments are designed such that an entire hollow space exists whose longitudinal extension and transverse extension covers the entire cabin region or at least a large part of the cabin region.

When compared to the production of conventional aircraft, the floor segment described above makes possible a significant reduction in the labour component in fitting out the interior equipment or the interior architecture so that the expenditure of both time and cost in the production of aircraft can be significantly reduced. In the case of conventional aircraft, the construction of the passenger cells and the construction of the system components are work steps that are completely separated from each other. After constructing the fuselage segments within the context of the so-called structural assembly, these fuselage segments are provided with the corresponding system installations during installation of the interior architecture. This takes place before, in the so-called final line, the individual segments are joined to form a complete aircraft fuselage. Only thereafter are the wings, tail unit, engines and the undercarriage assembled to form a complete aircraft.

When compared to conventional installation, with the use of the described floor segments the individual passenger cells and the system equipment required for them can be constructed in a single work step. This reduces the work component described above during equipment installation of the passenger compartment.

According to an exemplary embodiment of the invention, the upper partition and the lower partition form a self-supporting structure that comprises a hollow space. This provides the advantage that the floor segment does not require any external support so that the effectively available size of neither the space above the floor segment nor the space below the floor segment is reduced by any supports.

According to a further exemplary embodiment of the invention, the floor segment further comprises a connection element that is designed such that it can be coupled to another connection element of another floor segment so that an interface between one floor segment and the other floor segment is created. An interface defined in this way makes possible in an advantageous manner a modular design of the individual floor segments. This provides an advantage in that in an aircraft, in particular in regions of equal fuselage diameter, different floor segments can be combined as desired. As far as the cabin which is situated above is concerned, it is thus possible in a simple manner to achieve a multitude of outfits of the passenger compartment if during installation of the floor, which comprises a multitude of floor segments, correspondingly different floor segments are available.

Thus the described floor segment makes a contribution in significantly reducing the expenditure of time required in the installation or in a refit of the interior architecture of an aircraft. At the same time the option of accommodating system components in the individual floor segments, which option has been described above, makes it possible to increase the cabin space available to passengers. Furthermore, clearly improved flexibility in relation to the interior outfit of individual aircraft is achieved.

According to a further exemplary embodiment of the invention, the interface is designed for leading-through gases or liquids. This makes it possible to install supply lines for liquids and gases in the entire area of the passenger compartment.

According to a further exemplary embodiment of the invention, the interface is designed for leading-through electrical and/or optical lines. The lines can, for example, be control lines, data- or communication lines as well as lines for energy transmission. Lines for energy transmission are electrical supply lines, in particular current conduction lines. Optical lines are, in particular, glass fibre cables, which in modern means of locomotion, increasingly make it possible to achieve interference-free data transmission within the respective means of locomotion.

According to a further exemplary embodiment of the invention, the interface is designed as a quick coupling. Thus by simple plugging-in, a connection between various floor segments can be established in a simple manner.

According to a further exemplary embodiment of the invention, the interface is arranged on a face of the floor segment. Furthermore, the interface is designed such that one floor segment and another floor segment can only be coupled to each other in a predefined relative orientation. This prevents in a simple manner any erroneous rotation of a floor segment by 180° when a floor comprising a multitude of floor segments is installed. This precludes in a simple manner any instance of a floor being installed in which individual floor segments are positioned the wrong way round, i.e. with their underside erroneously facing upwards.

According to a further exemplary embodiment of the invention, the floor segment comprises at least one channel which is arranged in the hollow space and which is designed to accommodate lines. In this context the term "lines" refers to both electrical lines and optical lines, which are in particular used for data transmission. Likewise, the term "lines" also includes pipelines that are provided for conveying liquids and/or for conveying gases. Lines for liquids are in particular used for leading in fresh water or for leading away service water. In the case of an aircraft, gas lines are used in particular for an area-wide air conditioning system or for a system, which supplies emergency oxygen.

In particular in a modular design of the floor segments, closed channels for liquids and gases can be integrated in a simple manner without the use of separate pipes. To this effect these channels preferably comprise surface coatings that are adapted to the particular purpose of use.

It should be pointed out that for the purpose of facilitating maintenance, channels that are arranged in the hollow space can be accessible through corresponding openings in the upper and/or in the lower partition.

According to a further exemplary embodiment of the invention, the floor segment further comprises at least one separation element, which divides the hollow space into at least two sub-spaces. In this arrangement the sub-spaces can be dimensioned such that certain system devices such as, for example, fuel cells, valves, actuators, pumps etc. can be accommodated. The devices can be accessible from above or from below through openings in the upper or in the lower partition. Apart from system components it is also possible to integrate electronic devices in the floor segment, which electronic devices form a part of the in-flight entertainment system and/or of the information system for passengers.

According to a further embodiment of the invention, the floor segment comprises a storage container for gases and/or liquids. In this way a compact, space-saving and safe arrangement of corresponding storage containers can be ensured. A storage container can, in particular, be arranged in a sub-space of the hollow space.

As already explained above, a gas reservoir can, in particular, be used for storing emergency oxygen in a passenger aircraft. A liquid reservoir can, in particular, be considered suitable for storing fresh water or service water.

According to a further exemplary embodiment of the invention, the floor segment further comprises a storage container for items of baggage and/or items of equipment. In this case floor segments thus make possible a space-saving and secure arrangement also for items of baggage or equipment, where accidental flying around of such items is impossible even during a very turbulent flight phase of the aircraft. The storage container for items of baggage and/or equipment can, in particular, be arranged in a sub-space of the hollow space.

According to a further exemplary embodiment of the invention, the floor segment comprises an upper structure that extends upwards from the upper partition, and/or a lower structure that extends downward from the lower partition. Upper structures can be complete installations such as, for example, a galley, a lavatory with or without a toilet, or a lavatory with or without a shower. Lower structures can be installations, which, for example, are used for safely stowing away items of baggage on the ceiling of a lower passenger compartment, or for the ceiling-based securing of items of freight in a lower freight space.

According to a further exemplary embodiment of the invention, the upper partition and/or the lower partition comprises a rail system. In particular on the upper partition such a rail system is advantageous, on which, for example, passenger seats can be attached in a simple and at the same time reliable manner. Rails on the lower partition can, for example, be used for the attachment of overhead installations for affixing spatially changeable attachment elements that can be used for securing items of freight so that a high degree of transportation safety can be ensured.

According to a further exemplary embodiment of the invention, the upper partition and/or the lower partition comprises at least one connection point. In this context a connection point can be a mechanical fastening element that as a so-called hard point makes it possible to introduce forces into the floor segment without any distortion or damage to the floor segment. Such forces are, for example, caused by larger movable loads or by stationary installations. With a targeted design of defined fastening elements it is thus possible to construct stable floor segments even with a comparatively low mass.

A connection point can, however, also be an electrical or an optical coupling element, which represents a connection for a control line and/or for a communication line.

Furthermore, the connection point can also be a pneumatic coupling element. Thus a gas connection and/or a liquid connection can not only be provided on the lateral faces of the floor segment but also on the two partitions.

According to a further exemplary embodiment of the invention, the floor segment further comprises an illumination element. This provides an advantage in that in a simple and in particular in a space-saving manner illumination of the rear space by means of a corresponding illumination element in the lower partition can be implemented. Accordingly, illumination of the upper space can be implemented by means of integrating corresponding floor illumination elements in the upper partition of the floor segment.

According to a further exemplary embodiment of the invention, the floor segment further comprises a layer that comprises an electrical circuit. Such a layered design of an electrical circuit makes it possible to achieve a space-saving arrangement of electronic components, which can carry out a defined electronic function. Preferably the electrical circuit is implemented by means of a printed circuit that can be incorporated in the floor segment in a particularly space-saving manner.

The use of a printed circuit provides an advantage in that communication lines, control lines, power supplies etc. can be integrated in those layers of the floor segment that are particularly close to the surface.

According to a further exemplary embodiment of the invention, the floor segment comprises at least one heating element. This makes it possible to achieve particularly space-saving accommodation of a heater for cabin spaces and/or freight spaces so that the useful space effectively available for passengers or for freight is correspondingly increased.

Another embodiment of the invention includes a means of locomotion comprising a floor for the spatial separation of an interior space of the means of locomotion into a lower space and into an upper space, wherein the floor comprises at least two floor segments according to one of the above-mentioned embodiments.

The above-mentioned means of locomotion is based on the idea that an increase in the available space, in particular in a passenger cabin, can be achieved in that the floor of the aircraft is designed as a hollow body. The floor in the hollow body can be used for accommodating the cabin systems as well as for leading liquids, gases, electrical energy and control- and communication signals through.

In this context the term "floor" of the aircraft refers to the separating structure between different levels of an interior space of the means of locomotion. In an aircraft the floor can thus establish spatial separation of a passenger compartment from a cargo hold, or spatial separation of an upper passenger compartment from a lower passenger compartment.

According to an exemplary embodiment of the invention, the floor comprises several floor segments that comprise identical or compatible dimensions so that by combining the floor segments a closed floor can be created. During initial installation in or during modification work on a means of locomotion, such a modular design of a floor comprising several floor segments significantly reduces the labour component involved in fitting out an interior architecture.

If the individual floor segments are all of the same size and the same shape a floor is created in which the individual floor segments are arranged in the shape of a regular grid. In the case of different sizes or dimensions of the individual floor segments, optimal adaptation of the floor to a predetermined fuselage geometry can be achieved if the individual segments are compatible with each other. The notion of compatible dimensions refers to the lateral edges of the floor segments comprising lengths whose relation to each other is expressed in small whole numbers, i.e. integers.

According to a further exemplary embodiment of the invention, the individual floor segments are associated with a function that is required depending on the respective position of the floor segment within the floor. This provides an advantage in that the design or modification of the interior architecture of a corresponding means of locomotion can be made possible quickly, wherein the marginal conditions dictated by the spatial arrangement of the respective floor segments within a larger floor can be met and taken into account in a particularly elegant and efficient manner.

According to a further exemplary embodiment of the invention, a combination of floor segments arranged side by side provides a self-supporting structure. This has an advantage in that there is no need to provide a middle support for the floor, without this resulting in a reduction in the stability of a floor comprising several floor segments. This in turn provides an advantage in that the sub-space remains freely accessible and, for example, can be used as a cargo hold also for large objects, because no mechanical supports whatsoever impede the use of the cargo hold.

According to a further exemplary embodiment of the invention, the self-supporting structure is connected to an inside of the fuselage of the means of locomotion such that when a floor segment is subjected to a load at least one connection position between the fuselage and the self-supporting structure serves to transfer the load from the self-supporting structure to the fuselage. This may provide an advantage in that forces, which, for example, are generated by heavy weight on the floor, can be transmitted to the fuselage of the means of locomotion. In this way the stability of the floor that comprises several floor segments is increased.

According to a further exemplary embodiment of the invention, the self-supporting structure is connected to the inside of the fuselage of the means of locomotion such that when the fuselage is subjected to a load, at least one connection position between the fuselage and the floor serves to transfer the load from the fuselage to the self-supporting structure. In this way in an advantageous manner a floor, which can comprise several floor segments can contribute to an increase in the effective rigidity of the fuselage.

According to a further exemplary embodiment of the invention, the lower space is a cargo hold, and the upper space is a cabin space. In this arrangement, in the hollow space that is formed by the floor segments between the cargo hold and the cabin space, the accommodation of various system components is possible, which system components are required for fitting out the cabin space, the cargo hold, or both the cabin space and the cargo hold.

According to a further exemplary embodiment of the invention, the lower space is a lower cabin space while the upper space is an upper cabin space. In this way a floor that comprises several floor segments can be used also in the case of very large passenger aircraft that comprise several passenger levels.

According to a further exemplary embodiment of the invention, the means of locomotion additionally comprises a further floor for a spatial separation of the lower space or of the upper space. In this arrangement the further floor also comprises at least two of the above-mentioned floor segments.

Thus the above-mentioned floor segments can also be used in the construction of several floors, arranged one above the other, within a larger means of locomotion.

According to a further embodiment of the invention, the means of locomotion is an aircraft, in particular an aeroplane. In an aircraft, in particular a modern aircraft that provides a high level of comfort to passengers, a multitude of system components are required. Therefore a floor with a multitude of floor elements mentioned above is particularly well suited to accommodate a multitude of system components so that in an elegant manner the space provided within the aircraft is increased both for passengers and for any freight that may have to be carried.

Another aspect of the invention is the use of an above-mentioned floor element in a means of locomotion, in particular in an aircraft.

BRIEF DESCRIPTION OF THE FIGURES

Further advantages and features of the present invention are set out in the following exemplary description of an embodiment, which at present is a preferred embodiment. In the drawing the following are diagrammatically shown FIG. 1 the design of a floor by means of a multitude of floor segments, which floor extends along the entire interior space of an aircraft.

DETAILED DESCRIPTION OF ADVANTAGEOUS EXEMPLARY EMBODIMENTS

Figure 1:
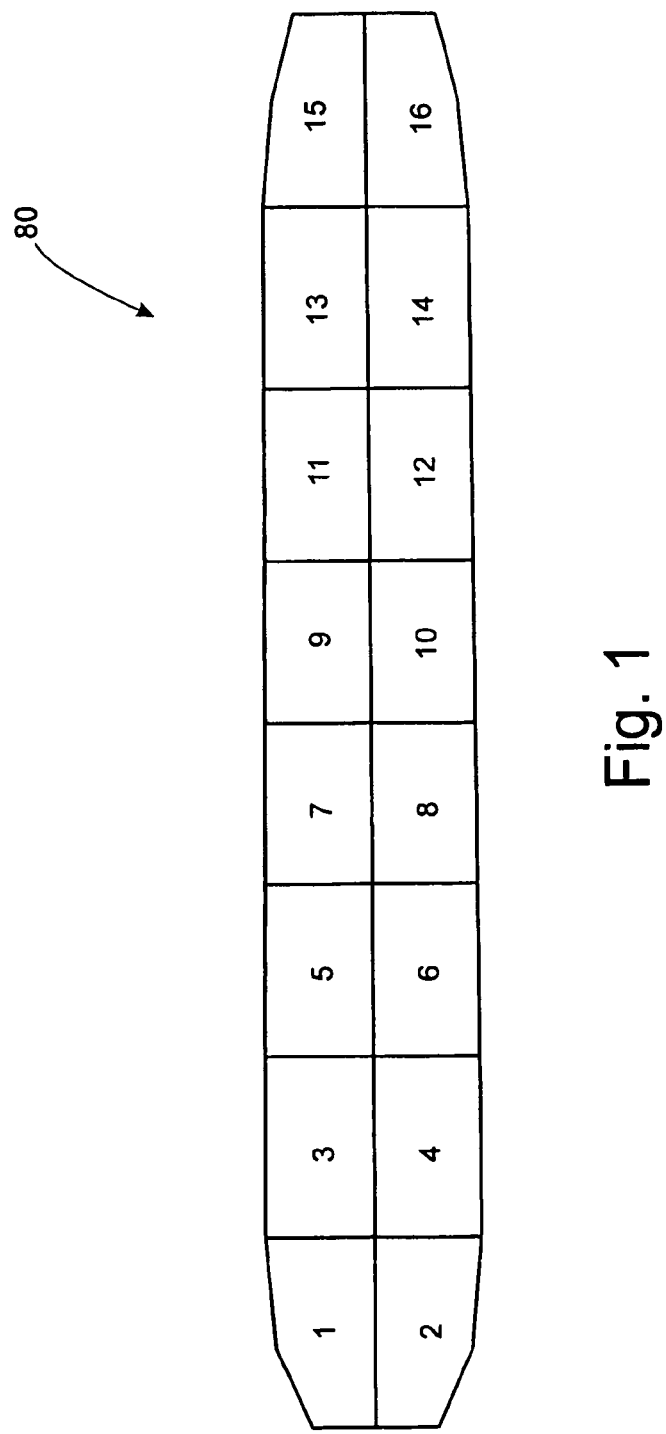

It should be noted that in the drawing the same reference characters are used for identical or corresponding components.

FIG. 1 shows an exemplary embodiment of the invention in which almost along the entire longitudinal extension of an aircraft fuselage there is a floor 80 of modular design, which floor separates a cargo hold beneath it from a passenger compartment above the floor. The floor comprises a total of 16 floor segments denominated by the reference signs 1 to 16. As shown in FIG. 1 the floor segments along the longitudinal extension of the fuselage are arranged in two rows, wherein the floor segments are just wide enough for the floor to also extend across the entire width of the fuselage.

The individual floor segments are designed such that, when they are interconnected by their faces, they form a self-supporting structure. The modular design of the floor is reflected by the spatial dimensions of the individual floor segments 1 to 16, wherein the floor segments 3 to 14 all have the same spatial dimensions. Depending on the required interior outfit of the aircraft, it is thus possible to arrange different floor segments in predetermined positions within the floor.

Figure 2:
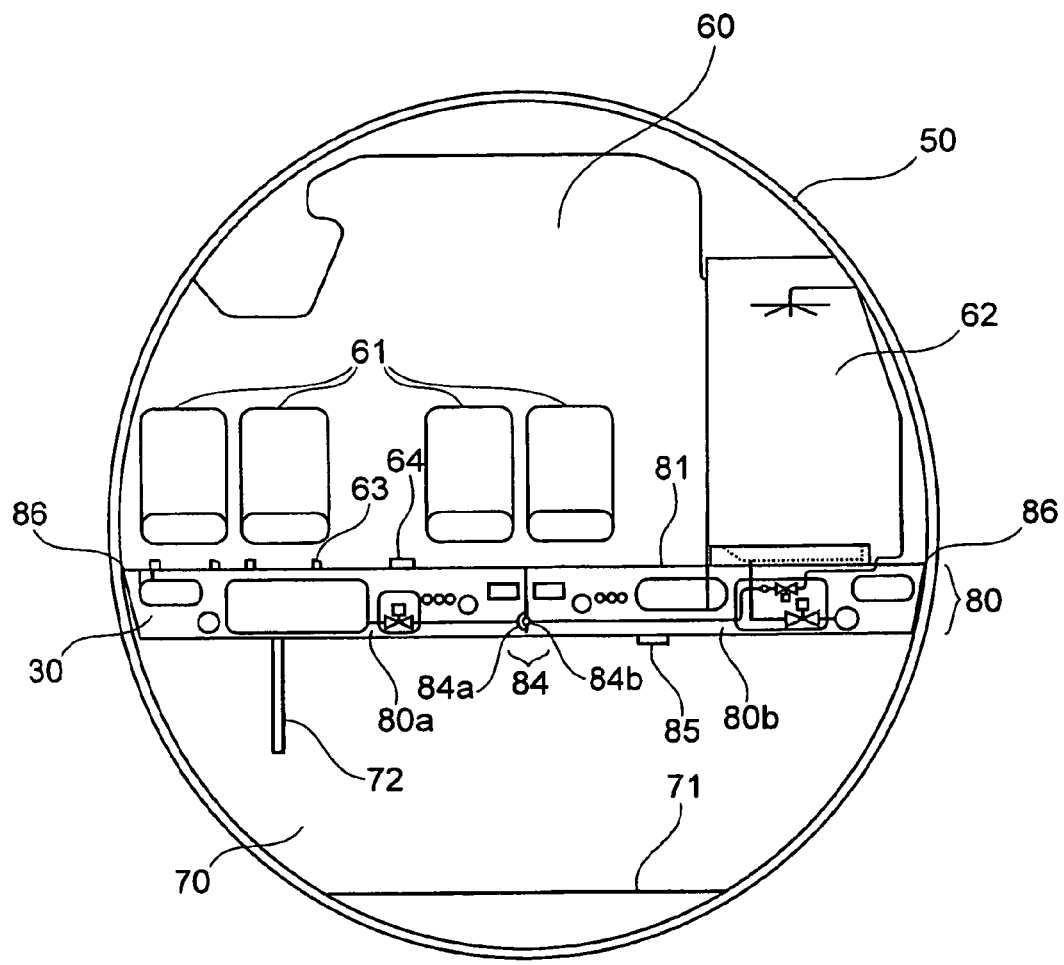
FIG. 2 a cross-sectional view of an aircraft fuselage, wherein the interior space of the aircraft is partitioned by a floor comprising several floor segments.

FIG. 2 shows a cross-sectional view of an aircraft fuselage 50, in which comprises a floor 80 is formed. The floor 80 divides an interior space of the aircraft fuselage 50 into a cargo hold 70 situated below and a passenger compartment 60 situated above.

According to the exemplary embodiment shown, the passenger compartment 60 comprises a multitude of seats 61, which, in a way that is not shown, are attached to a rail system 63 so that even during turbulent phases of flight, safe retention of the seats 61 is ensured. The passenger compartment 60 further comprises a shower cabin 62, which according to the exemplary embodiment shown is arranged on the right-hand side of the passenger compartment 60. Furthermore, connection points 64 are provided in the passenger compartment 60, with each of said connection points 64 representing a mechanical attachment element for the loads (not shown) contained in the passenger compartment 60. Likewise, the connection points 64 can also be electrical and/or optical coupling elements that make it possible to lead lines from a hollow space 30, which hollow space is formed, between an upper partition 81 and a lower partition 82, by two floor segments 80a and 80b. The hollow space 30 is provided for accommodating system components integrated in the floor 80, which components are explained in more detail below with reference to FIG. 3.

The cargo hold 70 comprises a loading area 71, which is provided to accommodate cargo. Furthermore, a lower structure 72 is provided on the lower partition 82, which lower structure 72 extends from the floor 80 downward into the cargo hold 70. The lower structure 72 can be used for locking freight into place by means of components that are not shown.

The first floor segment 80a comprises a connection element 84a that is designed so that it can be coupled to a connection element 84b of the second floor segment 80b. The two connection elements 84a and 84b form a defined interface 84.

Preferably the connection elements 84a and 84b, as well as further connection elements of floor segments (not shown), are arranged at defined positions so that by means of several floor segments an entire floor 80 (see FIG. 1) can be constructed in a modular way. The integrated system components can extend in the entire hollow space 30 along the entire horizontal extension of the floor 80.

On the lower partition 82, furthermore, there is a connection point 85 which can carry out the same functions as the connection point 64 described above, which is formed to the upper partition 81.

The floor 80 is attached to the fuselage on two connection positions 86. Since the floor 80 is a self-supporting and mechanically stable structure it thus also contributes to the rigidity of the fuselage 50. Thus the fuselage 50 and the floor 80 together form both a stable fuselage 50 and a stable floor 80 that comprises several floor segments 80a, 80b.

Figure 3:
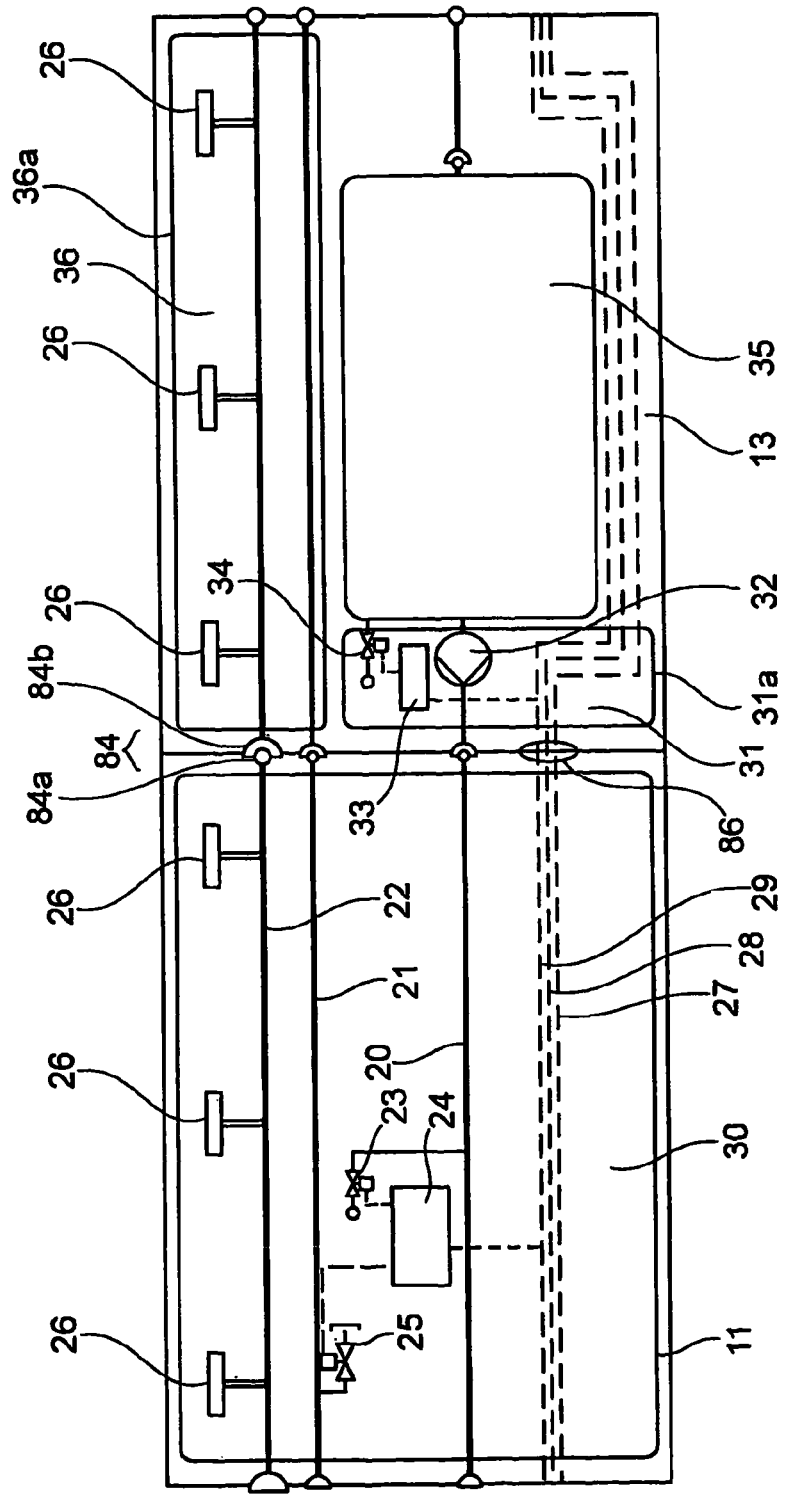
FIG. 3 a combination of two floor segments with system components arranged in the hollow spaces of the two floor segments.

FIG. 3 shows a top view of the two floor segments 11 and 13 (see FIG. 1). In this arrangement the upper partition of the two floor segments 11 and 13 is not shown so that all the system components that are located in the hollow space formed by the two floor segments 11 and 13 are visible.

It should be clearly understood that the embodiment shown in particular in FIG. 3 is just one exemplary embodiment selected at random from a multitude of possible embodiment variants of the invention.

In the hollow space 30, which is created between the two floor segments 11 and 13, there is a freshwater line 20 that is coupled to a pump 32. The pump 32 is located in the floor segment 13. In both floor segments 11 and 13 along the entire longitudinal extension a waste water line 21 extends, which comprises two sections that at the boundary between the two floor segments 11 and 13 are interconnected by an corresponding interface.

Furthermore, along the entire length of the two floor segments 11 and 13 an air conditioning duct 22 extends, which comprises several outlets 26 that are provided for the supply of conditioned air to the passenger compartment.

The waste water line 21 comprises a waste water valve 25 that is arranged in the floor segment 11. The freshwater line 20 comprises a shut-off valve 23 that is also arranged in the floor segment 11. Both the shut-off valve 23 and the waste water valve 25 are coupled to a valve control unit designated by the reference character 24.

Both floor segments 11 and 13 are furthermore connected to each other by way of a number of electrical lines, which include an electrical supply line 27, a data line 28, and a communication line 29.

The floor segment 13 further comprises a hollow space 41 that is generated by a separation element 31*a*. The hollow space 41 is provided for accommodating electrical devices, for example the freshwater pump 32 as well as a control unit 33 coupled to the pump 32. Furthermore, a drainage valve 34 is provided in the hollow space 31, which drainage valve 34 is arranged in a freshwater reservoir 35 and which can also be activated by the control unit 33. By opening the drainage valve 34, negative pressure in the freshwater reservoir 35, which negative pressure is generated by removing fresh water by means of the pump 32, can be compensated for by letting in air in a corresponding manner.

Furthermore, the floor segment 13 comprises a hollow space 36 that is created by a separation element 36*a*. In a manner, which is not shown here, this hollow space can be used to accommodate items of baggage or other items of equipment from the passenger compartment.

In addition, it should be pointed out that "comprising" does not exclude other elements, and "a" or "one" does not exclude a plural number. Furthermore, it should be pointed out that features or steps which have been described with reference to one of the above exemplary embodiments can also be used in combination with other features or steps of other exemplary embodiments described above. Reference signs in the claims are not to be interpreted as limitations.

In summary, this application describes a floor segment 11, 13 for a means of locomotion, in particular for an aircraft, for the spatial separation of an interior space of the means of locomotion into a lower space 70 and into an upper space 60. The floor segment 11, 13 comprises an upper partition 81 and a lower partition 82, which together with the upper partition encloses a hollow space 30, which is equipped to accommodate system components 20-29, 32-35 of the means of locomotion. The floor segments are preferably of a modular design so that within a floor 80 individual floor segments 11, 13 can be exchanged for other floor segments 11, 13 that comprise identical or compatible dimensions and connections for the system components.

LIST OF REFERENCE CHARACTERS

1-16 Floor segments
20 Freshwater line
21 Waste water line
22 Air conditioning duct
23 Shut-off valve
24 Control unit for valves
25 Waste water valve
26 Outlets from the air conditioning duct to the passenger compartment
27 Electrical supply line
28 Data line
29 Communication line
30 Hollow space
31 Hollow space for equipment
31*a* Separation element
32 Pump for fresh water
33 Control unit of the pump 32
34 Drainage valve
35 Reservoir for fresh water
36 Hollow space
36*a* Separation element
50 Fuselage
60 Passenger compartment
61 Seats
62 Shower cabin
63 Rail system
64 Connection point
70 Cargo hold
71 Loading area
72 Lower structure
80 Floor with integrated system components
80*a* First floor segment
80*b* Second floor segment
81 Upper partition
82 Lower partition
84 Interface for air conditioning duct
84*a* Connection element
84*b* Connection element
85 Connection point
86 Connection position, floor-fuselage
87 Interface for electrical lines

The invention claimed is:

1. An aircraft floor for the spatial separation of an interior space of an aircraft into a lower space and into a passenger compartment, wherein the floor comprises:
   a plurality of hollow floor segments arranged in a longitudinal extension along the direction of transport wherein first and second of said hollow floor segments include first and second attachment connections, respectively, laterally securing the first hollow floor segment to the second hollow floor segment thereby forming a self-supporting module that is mechanically stable and creating an interface between the first and second hollow floor segments;
   wherein said first hollow floor segment is connected to a fuselage of the aircraft at a first distal connection, said second hollow floor segment is connected to the fuselage at a second distal connection;
   wherein the first and second distal connections are substantially directly opposite to one another and are the only connections securing said self-supporting module to the fuselage;
   wherein said self-supporting module comprises an upper partition and a lower partition enclosing a hollow space therebetween, which hollow space is equipped for accommodating system components.

2. The floor according to claim 1, wherein
   the interface is configured for leading-through gases or liquids.

3. The floor according to claim 1, wherein
   the interface is configured for leading-through at least one of electrical and optical lines.

4. The floor according to claim 1, wherein
   the interface is arranged on a face of each of the hollow floor segments, and is configured such that the first hollow floor segment and the second hollow floor segment can only be coupled to each other in a predefined relative orientation.

5. The floor according to claim 1, wherein each of the plurality of hollow floor segments further comprises at least one channel arranged in the hollow space and configured to accommodate lines.

6. The floor according to claim 1, wherein at least one of the plurality of hollow floor segments further comprises at least one separation element dividing the hollow space into at least a first sub-space and a second sub-space.

7. The floor according to claim 1, wherein at least one of the plurality of hollow floor segments further comprises a storage container for at least one of gases and liquids.

8. The floor according to claim 1, wherein at least one of the plurality of hollow floor segments further comprises a storage container for items of at least one of baggage and items of equipment.

9. The floor according to claim 1, wherein at least one of the plurality of hollow floor segments further comprises at least one of an upper structure extending upwards from the upper partition, and
a lower structure extending downward from the lower partition.

10. The floor according to claim 1, wherein at least one of the upper partition and the lower partition of at least one of the plurality of hollow floor segments comprises a rail system.

11. The floor according to claim 1, wherein at least one of the upper partition and the lower partition comprise at least one connection point.

12. The floor according to claim 1, wherein at least one of the plurality of hollow floor segments further comprises at least one illumination element.

13. The floor according to claim 1, wherein at least one of the plurality of hollow floor segments further comprises a layer comprising an electrical circuit.

14. The floor according to claim 1, wherein at least one of the plurality of hollow floor segments further comprises at least one heating element.

15. A transportation system comprising:
a first floor for the spatial separation of an interior space into a lower space and into a passenger compartment,
wherein the first floor comprises at least a first plurality of hollow floor segments arranged in a longitudinal extension along the direction of transport;
wherein first and second of said hollow floor segments include first and second attachment connections, respectively, laterally securing the first hollow floor segment to the second hollow floor segment thereby forming a self-supporting module that is mechanically stable and creating an interface between the first and second hollow floor segments;
wherein said first hollow floor segment is connected to a fuselage at a first distal connection, said second hollow floor segment is connected to the fuselage at a second distal connection;
wherein the first and second distal connections are substantially directly opposite to one another and are the only connections securing said self-supporting module to the fuselage;
wherein each said self-supporting module comprises an upper partition and a lower partition enclosing a hollow space therebetween, which hollow space is equipped for accommodating system components.

16. The system according to claim 15, wherein
the self-supporting module is configured to be connected to an inside of the fuselage such that when each of the first plurality of floor segments is subjected to a load, at least one connection position between the fuselage and the self-supporting module serves to transfer the load from the self-supporting module to the fuselage.

17. The system according to claim 16, wherein
the self-supporting module is configured to be connected to an inside of the fuselage such that when the fuselage is subjected to a load, at least one connection position between the fuselage and the self-supporting module serves to transfer the load from the fuselage to the self-supporting structure.

18. The system according to claim 15, wherein
the lower space is a cargo hold.

19. The system according to claim 18, further comprising a second floor for spatial separation of the lower space or of the upper space, wherein the second floor comprises at least least third and fourth floor segment.

20. The system according to claim 18, wherein
the transportation system is an aircraft.

21. The system of claim 15, wherein
the first floor comprises at least a second plurality of floor segments comprising identical or compatible dimensions for creating a closed floor by combining the second plurality of floor segments.

22. The system according to claim 21, wherein
each of the second plurality of floor segments are associated with a function that is required dependently of a respective position of each of the second plurality of floor segments within the floor.

23. The system according to claim 21, wherein
a combination of at least a first of the second plurality of floor segments and a second of the second plurality of floor segments configured to be side by side provides a self-supporting structure.

24. The floor of claim 1, wherein the each of the lower partitions of the hollow floor segments comprise a substantially planar face.

25. The floor of claim 24, wherein the planar faces of the lower partitions are disposed at a predetermined distance from a cargo deck of the aircraft.

26. The floor of claim 24, wherein the planar faces of the lower partitions are disposed at a predetermined distance from a bottom of the fuselage.

\* \* \* \* \*

UNITED STATES PATENT AND TRADEMARK OFFICE
CERTIFICATE OF CORRECTION

PATENT NO. : 8,556,211 B2  Page 1 of 1
APPLICATION NO. : 12/223830
DATED : October 15, 2013
INVENTOR(S) : Hoffjann et al.

It is certified that error appears in the above-identified patent and that said Letters Patent is hereby corrected as shown below:

In the claims

Column 12, line 25, claim 19, delete "18" and insert therefor --15--.
Column 12, line 29, claim 20, delete "18" and insert therefor --15--.

Signed and Sealed this
Seventh Day of June, 2016

Michelle K. Lee
*Director of the United States Patent and Trademark Office*